United States Patent
Innocent et al.

(10) Patent No.: US 11,722,794 B2
(45) Date of Patent: Aug. 8, 2023

(54) IMAGE SENSOR WITH MULTI-GAIN READOUT

(71) Applicant: SEMICONDUCTOR COMPONENTS INDUSTRIES, LLC, Phoenix, AZ (US)

(72) Inventors: Manuel H. Innocent, Wezemaal (BE); Jeffery Beck, Philomath, OR (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/371,381

(22) Filed: Jul. 9, 2021

(65) Prior Publication Data

US 2023/0008046 A1   Jan. 12, 2023

(51) Int. Cl.
*H04N 25/59* (2023.01)
*H04N 25/57* (2023.01)
(Continued)

(52) U.S. Cl.
CPC ............. *H04N 25/59* (2023.01); *H04N 25/50* (2023.01); *H04N 25/57* (2023.01); *H04N 25/585* (2023.01); *H04N 25/75* (2023.01)

(58) Field of Classification Search
CPC ......... H04N 5/351–3559; H04N 5/378; H04N 5/355; H04N 25/50–59; H04N 25/75
See application file for complete search history.

(56) References Cited

U.S. PATENT DOCUMENTS

2004/0041077 A1   3/2004   Fossum
2006/0181622 A1   8/2006   Hong
(Continued)

FOREIGN PATENT DOCUMENTS

JP    2003134396 A   5/2003

OTHER PUBLICATIONS

Adachi et al., "A 200-μV/e- CMOS image sensor with 100-ke-full well capacity," IEEE Journal of Solid-State Circuits vol. 43, No. 4, Apr. 2008.
(Continued)

*Primary Examiner* — Lin Ye
*Assistant Examiner* — Chriss S Yoder, III
(74) *Attorney, Agent, or Firm* — Treyz Law Group, P.C.; Tianyi He

(57) ABSTRACT

An image sensor may include an array of image pixels. The array of image pixel may be coupled to control circuitry and readout circuitry. One or more image pixels in the array may each include a photodiode and a floating diffusion region. The floating diffusion region may be coupled to a charge storage structure for a low conversion gain configuration and can be coupled to a charge storage structure for a medium conversion gain configuration. The medium conversion gain charge storage structure may be activated when transferring photodiode charge to the floating diffusion region for a high conversion gain configuration. The control circuitry may control each pixel to perform a high conversion gain readout operation, a medium conversion gain readout operation, and a low conversion gain readout operation. If desired, the medium conversion gain readout operation may be omitted.

20 Claims, 7 Drawing Sheets

(51) Int. Cl.
  *H04N 25/75* (2023.01)
  *H04N 25/585* (2023.01)
  *H04N 25/50* (2023.01)

(56) References Cited

U.S. PATENT DOCUMENTS

2013/0001403 A1  1/2013  Yamakawa
2015/0021459 A1  1/2015  Roy
2022/0337777 A1* 10/2022 Shim ..................... H04N 5/378

OTHER PUBLICATIONS

Search Report for counterpart DE Application No. 102022115235.9, dated Apr. 20, 2023, 7 pages.

* cited by examiner

IMAGE SENSOR WITH MULTI-GAIN READOUT

BACKGROUND

This relates generally to imaging systems, and more particularly, to image sensors in the imaging systems.

Image sensors are commonly used in electronic systems or devices to generate image data. In a typical arrangement, an image sensor includes an array of image sensor pixels, each image sensor pixel containing a photodiode for generating charge based on incident light.

The photodiode-generated charge can be read out using different conversion gain configurations at the image sensor pixels. However, it can be difficult to balance the various considerations associated with the different conversion gain configurations while still improving dynamic range and minimizing different types of noise across all light regimes.

It is within this context that the embodiments herein arise.

DETAILED DESCRIPTION

Electronic systems such as cameras, computers, cellular telephones, automotive electronic systems, industrial electronic systems, and other electronic systems can include image sensors that gather incident light to generate image data (e.g., capture one or more images and/or video). The image sensors can include one or more arrays of (active) image sensor pixels. The image sensor pixels can include photosensitive elements such as photodiodes that convert the incident light into image charge. The image sensors can have any number of image sensor pixels (e.g., hundreds or thousands or more). A typical image sensor can, for example, have hundreds of thousands or millions of image sensor pixels (e.g., megapixels). The image sensors can include control circuitry such as circuitry for operating (e.g., controlling the operation of) the image sensor pixels and readout circuitry for reading out image signals corresponding to the image charge generated by the photosensitive elements.

Figure 1:
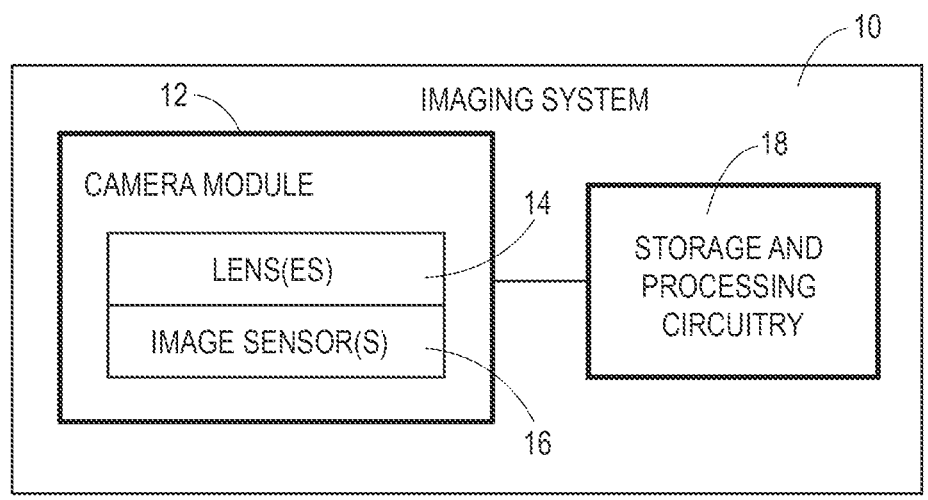
FIG. 1 is a functional block diagram of an illustrative imaging system having one or more image sensors and processing circuitry for generating image data in accordance with some embodiments.

FIG. 1 is a functional block diagram of an illustrative imaging system (e.g., an electronic system with imaging capabilities) such as imaging system 10. Imaging system 10 of FIG. 1 may be (e.g., form part of) a portable electronic device such as a camera, a cellular telephone, a tablet computer, a laptop computer, a webcam, or a video camera, may be other types of imaging systems such as a video surveillance system, an automotive system (e.g., an automotive electronic system, an automotive sensor system, an automotive imaging system, an embedded system in automotive electronics, or any other part of an automotive system), a video gaming system with imaging capabilities, an augmented reality and/or virtual reality system, an unmanned aerial vehicle system (e.g., a drone), or an industrial electronic system, or may be any other suitable imaging systems or devices that generate image data.

Imaging system 10 includes camera module 12 (sometimes referred to as imaging module 12). Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16 and other macro lenses. If desired, camera module 12 may be provided with an array of lenses 14 and an array of corresponding image sensors 16.

During image capture operations, light from a scene may be focused onto image sensor 16 by lenses 14. Image sensor 16 may include circuitry for converting analog pixel image signals into corresponding digital image data that is provided to storage and processing circuitry 18.

Storage and processing circuitry 18 (sometimes referred to herein collectively as control circuitry 18) may include and be implemented on one or more integrated circuits (e.g., one or more integrated circuit dies). As illustrative examples, the processing component of circuitry 18 may include one or more image processing circuits or digital signal processors, one or more microprocessors or microcontroller, one or more (general or special purpose) processors each having one or more processing cores, or any other suitable circuitry for manipulating or processing data. The storage component of circuitry 18 may include non-volatile memory circuitry such as a hard drive, a solid-state drive, read-only memory, and/or any other type of non-volatile memory circuitry, or other data storage devices. If desired, circuitry 18 may include volatile memory such as random-access memory.

In some illustrative configurations described herein as examples, the storage component of circuitry 18 (e.g., non-transitory computer-readable media) stores instructions (e.g., software, firmware, code, etc.) executable by the processing component of circuitry 18. When executed by the processing component of circuitry 18, these instructions can implement one or more processes (e.g., processing schemes, control schemes, etc.) described herein. In such a manner, control circuitry 18 can be configured to control the operations of imaging system 10 (e.g., components such as image sensor 16 or other components within imaging system 10).

Control circuitry 18 may be implemented using components that are separate from camera module 12 and/or that form part of the camera module (e.g., circuits that form part of an integrated circuit that includes image sensor 16 or an integrated circuit within the module that is associated with image sensor 16). When control circuitry 18 is included on different integrated circuits (e.g., chips) than those of one or more image sensors 16, the integrated circuits associated with control circuitry 18 may be stacked to or packaged together with the integrated circuits associated with one or more image sensors 16. Image data that has been generated by camera module 12 may be processed and stored using control circuitry 18 (e.g., using an image processing engine in control circuitry 18, using an imaging mode selection engine in control circuitry 18, etc.). Processed image data may, if desired, be provided to external equipment (e.g., a computer, an external display, an electronics control unit, an external system to which imaging system 10 is a sub-system, or other systems or devices) using wired and/or wireless communications paths coupled to control circuitry 18.

Figure 2:
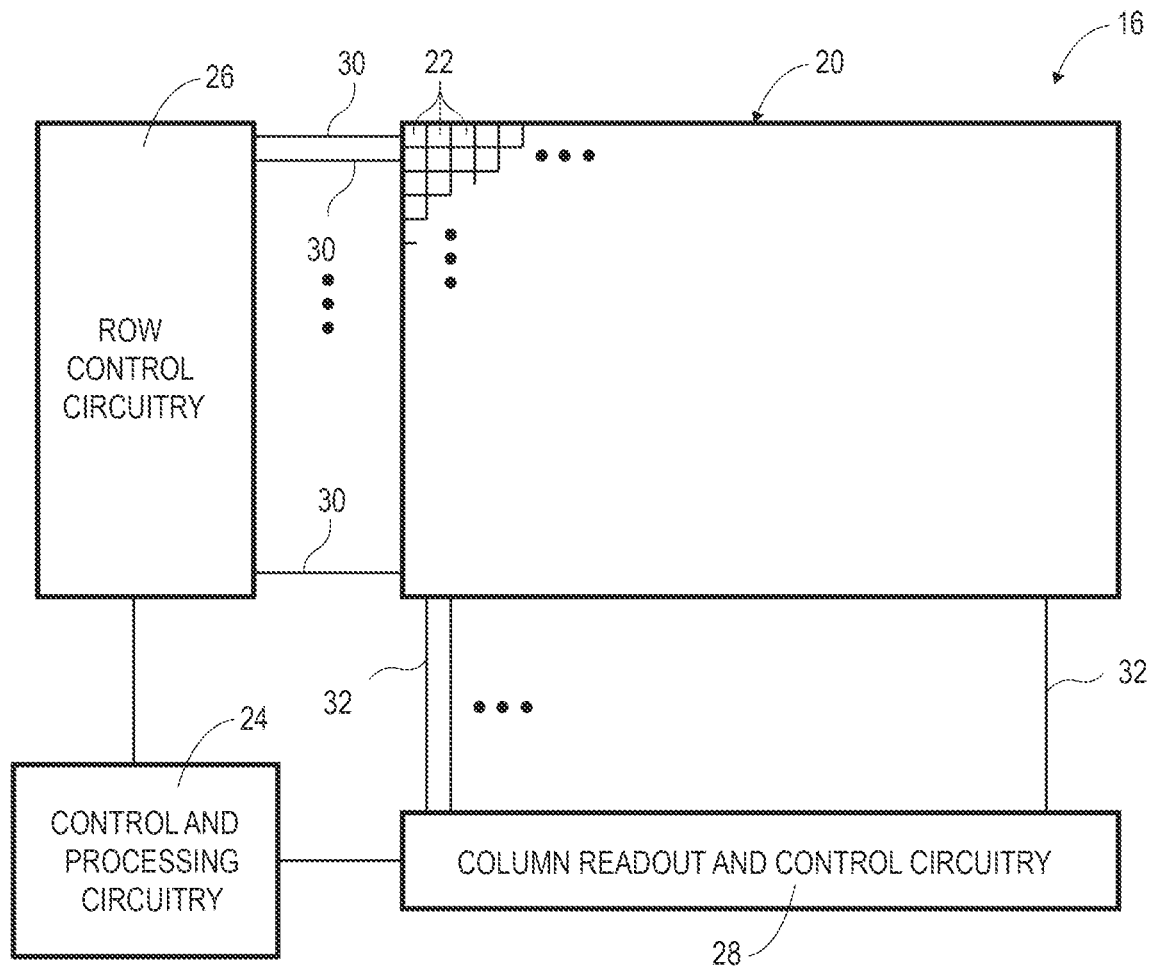
FIG. 2 is a functional block diagram of illustrative image sensor circuitry having a pixel array and control and readout circuitry for the pixel array in accordance with some embodiments.

FIG. 2 is a functional block diagram of an illustrative image sensor such image sensor 16 (e.g., that may be implemented as image sensor 16 in system 10 in FIG. 1). As shown in FIG. 2, image sensor 16 includes a pixel array 20 containing image sensor pixels 22 (sometimes referred to herein as image pixels 22 or pixels 22). In some configurations described herein as illustrative examples, image pixels 22 may be arranged in rows and columns. Array 20 may contain, for example, hundreds or thousands of rows and columns of image pixels 22.

In the example of FIG. 2, image sensor 16 includes control and processing circuitry 24 (sometimes referred to herein as control circuitry 24). Control circuitry 24 is coupled to row control circuitry 26 (sometimes referred to as row driver circuitry 26) and column readout and control circuitry 28 (sometimes referred to as column control circuitry 28, column readout circuitry 28, or readout circuitry 28). Control circuitry 24 may provide timing controls for row control circuitry 26 (e.g., may receive row addresses for which certain control signals are to be asserted or deasserted). Accordingly, based on the timing controls, row control circuitry 26 may supply (e.g., assert or deassert) corresponding row control signals such as reset, anti-blooming, row select, charge transfer, dual conversion gain (e.g., low conversion gain), readout, and/or any other suitable pixel control signals to each row of pixels 22 over one or more conductive paths for that row (e.g., over row control paths 30).

One or more conductive paths such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 can be selected using row control circuitry 26, and image signals generated by image pixels 22 in that pixel row can be read out along column lines 32.

Column readout circuitry 28 may receive image signals (e.g., analog pixel values generated by pixels 22) over column lines 32. Column readout circuitry 28 may include memory circuitry for temporarily storing calibration signals (e.g., reset level signals, reference level signals) and/or image signals (e.g., image level signals) read out from array 20, amplifier circuitry, analog to digital conversion (ADC) circuitry, bias circuitry, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Column readout circuitry 28 may supply the digital pixel data associated with pixels in one or more pixel columns to control and processing circuitry 24 and/or storage and processing circuitry 18 (FIG. 1).

One or more of control and processing circuitry 24, row control circuitry 26, and column readout and control circuitry, may be referred to herein as control circuitry (for image sensor 16). In particular, the control circuitry may be configured to control the operation (e.g., a shutter operation, a charge integration operation, a readout operation, etc.) of one or more pixels 22 in array 20 in generating image data (e.g., analog image signals and subsequently digital image data). The control circuitry may include associated storage circuitry (e.g., non-transitory computer-readable media) configured to store instructions (e.g., software, firmware, code, etc.) executable by the processing component of the control circuitry. When executed by the processing component of the control circuitry, these instructions can implement one or more processes (e.g., processing schemes, control schemes, etc.) described herein (e.g., one or more timing diagrams for controlling one or more pixels 22 in array 20). In such a manner, the control circuitry can be configured to control the operations of pixels 22 and/or other components in image sensor 16.

Additionally, pixel array 20 may be provided with a filter array having multiple (color) filter elements (each corresponding to one or more respective pixels) which allows a single image sensor to sample light of different colors or sets of wavelengths. As an example, image sensor pixels 22 in array 20 may be provided with a color filter array having red, green, and blue filter elements, which allows a single image sensor to sample red, green, and blue (RGB) light using corresponding red, green, and blue image sensor pixels arranged in a Bayer mosaic pattern. As another example, the green pixels in a Bayer pattern may be replaced by broadband image pixels having broadband color filter elements (e.g., clear color filter elements, yellow color filter elements, etc.). In yet another example, one of the green pixels in a Bayer pattern may be replaced by infrared (IR) image pixels formed under IR filter elements and/or the remaining red, green, and blue image pixels may also be sensitive to IR light (e.g., may be formed under filter elements that pass IR light in addition to light of their respective colors). These examples are merely illustrative. In general, filter elements of any desired color and/or wavelength and in any desired pattern may be formed over any desired number of image pixels 22.

Figure 3:
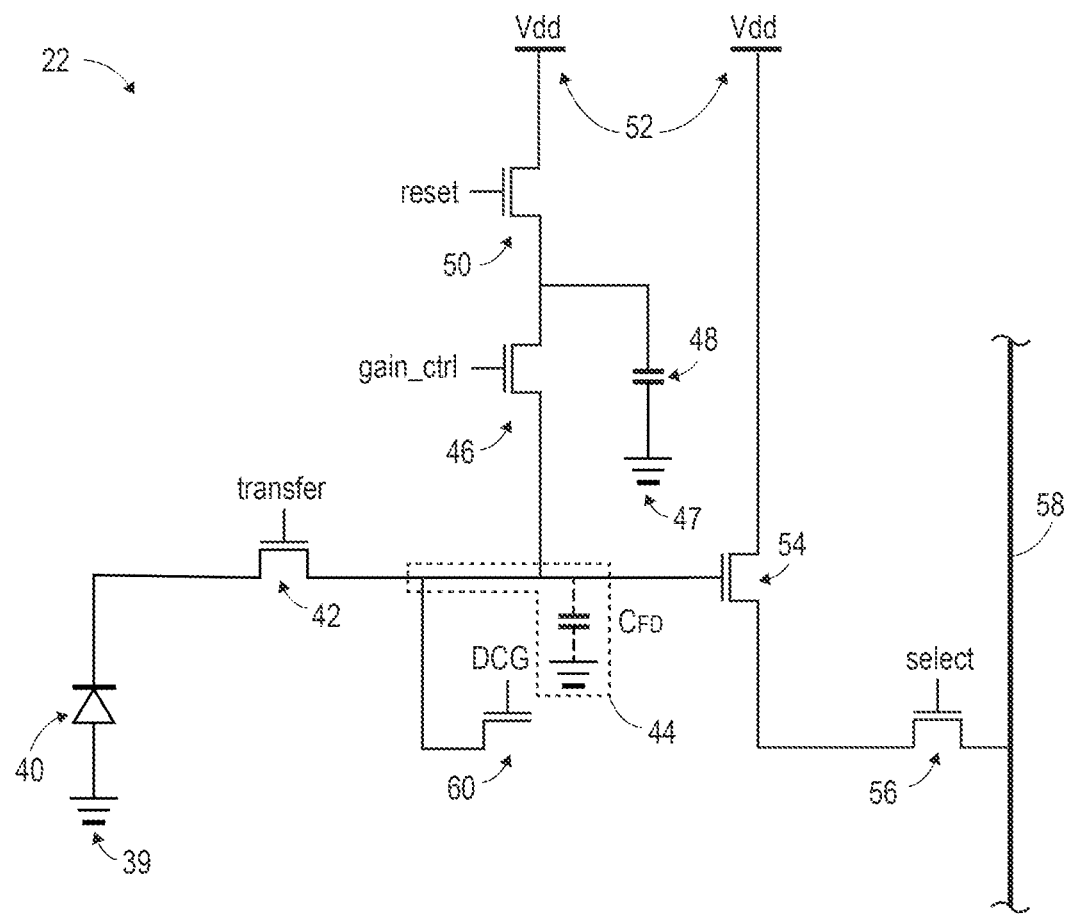
FIG. 3 is a circuit diagram of an illustrative image pixel having first and second conversion gain devices coupled to a floating diffusion region in accordance with some embodiments.

FIG. 3 is a circuit diagram of an illustrative image sensor pixel such as image sensor pixel 22 (e.g., that may be implemented as one or more image sensor pixels 22 in FIG. 2). As shown in FIG. 3, pixel 22 includes a photosensitive element such as photodiode 40 (e.g., a pinned photodiode with a pinning voltage). Photodiode 40 has a first terminal coupled to a voltage terminal 39 that receives a reference voltage (e.g., a ground voltage) and a second terminal at which image charge is stored. Photodiode 40 may generate charge (e.g., electrons) in response to receiving incident light (e.g., impinging photons). The amount of charge that is generated by photodiode 40 may depend on the exposure duration (or integration time) and the intensity of the incident light (e.g., in a high-light environment, in a mid-light environment, in a low-light environment, etc.).

Pixel 22 in FIG. 3 also includes a floating diffusion region such as floating diffusion region 44. Floating diffusion region 44 may be a doped semiconductor region (e.g., a region in a silicon substrate that is doped by ion implantation, impurity diffusion, or any other doping process). Accordingly, floating diffusion region 44 may have an associated charge storage capacity (e.g., schematically shown as a capacitor having capacitance $C_{FD}$ in FIG. 3). Photodiode-generated charge and/or other charge (e.g., reset voltage level charge, dark current charge, etc.) may be transferred to and stored at floating diffusion region 44 for one or more pixel readout operations.

In the example of FIG. 3, charge transfer transistor 42 receiving control signal 'transfer' at its control (gate) terminal may couple photodiode 40 (at its first source-drain terminal) to floating diffusion region 44 (at its second source-drain terminal). Transistor 42 may therefore be activated (when control signal 'transfer' is asserted, fully or partially) to transfer photodiode-generated charge to floating diffusion region 44.

For high dynamic range applications, it may be desirable to extend the storage capacity of floating diffusion region 44 and operate pixel 22 in a low (conversion) gain mode of (readout) operation by including a low (conversion) gain charge storage structure. As shown in FIG. 3, pixel 22 includes a charge storage structure such as capacitor 48 (e.g., a low gain capacitor). Capacitor 48 has a first terminal coupled to a voltage terminal 47 and a second terminal that serves as its charge storage terminal. Voltage terminal 47 may provide a fixed voltage (e.g., a ground or supply voltage) or may provide a controllable variable voltage signal (e.g., exhibiting a first voltage across a first time period and exhibiting a second voltage across a second period of time).

Capacitor 48 is coupled to floating diffusion region 44 by transistor 46 receiving control signal 'gain_ctrl' at its control terminal. When transistor 46 is activated (e.g., when control signal 'gain_ctrl' is asserted), capacitor 48 may be electrically connected to floating diffusion region 44, thereby extending the charge storage capacity (capacitance $C_{FD}$) of floating diffusion region 44. Additionally, when transistors 42 and 46 are both activated (e.g., when control signals 'transfer' and 'gain_ctrl' are both partially asserted), (a portion of) photodiode-generated charge may be transferred from photodiode 40 to capacitor 48.

To reset one or more pixel elements (e.g., to a reset voltage level), pixel 22 may include one or more reset transistors such as transistor 50 receiving control signal 'reset' at its control terminal. As shown in FIG. 3, transistor 50 couples a voltage terminal 52 that receive a reference voltage (e.g., a power supply voltage associated with a reset voltage level) to floating diffusion region 44 (via intervening transistor 46). In particular, when transistors 46 and 50 are both activated (e.g., when control signals 'reset' and 'gain_ctrl' are both asserted), floating diffusion region 44 may be reset to a reset voltage level (e.g., a power supply voltage). Additionally, transistor 50 couples capacitor 48 to voltage terminal 52, and as such, when activated, also resets capacitor 48 to the reset voltage level. Transistor 50, when activated along with transistors 42 and 46 (by asserting their corresponding control signals), may also reset photodiode 40 to the reset voltage level.

Pixel 22 in FIG. 3 also includes source follower transistor 54 (coupled to voltage terminal 52) and pixel select (or row select) transistor 56 that form the readout (circuitry) portion of pixel 22. In particular, select transistor 56 has a control (gate) terminal that is controlled by control signal 'select'. When control signal 'select' is asserted and transistor 56 is activated, a corresponding pixel output signal having a magnitude that is proportional to the amount of charge at floating diffusion region 44 is passed onto a pixel output path such as column line 58 (e.g., line 32 in FIG. 2) via source follower transistor 54. When floating diffusion region 44 stores photodiode-generated charge that is being read out, the corresponding pixel output signal may be referred to as an image (level) signal. When floating diffusion region 44 stores reset voltage level charge that is being read out, the corresponding pixel output signal may be referred to as a reset level signal.

In an illustrative image pixel array configuration, there are numerous rows and columns of pixels 22. A column line 58 may be associated with each column of pixels 22 (e.g., each image pixel 22 in a column may be coupled to the same column line 58 through a corresponding row select transistor 62). Control signal 'select' may be asserted to read out a pixel output signal from a selected image pixel 22 onto column line 58. The pixel output signal may be provided to readout circuitry 28 (FIG. 2), and thereafter, to processing circuity 18 (FIG. 1) for further processing.

An image sensor having an array of image pixel may operate in varying light conditions (e.g., in a relatively low-light environment, in a relatively high-light environment, in an intermediate (mid) light environment between the low- and high-light environment, etc.). In some applications (e.g., for high dynamic range applications), it may be desirable for the image pixel to generate more than one image signal (e.g., two image signals, three image signals, etc.) for each integration cycle (e.g., for each integration time period). In other words, these image signals may be read out in two or more read out operations with varying gains.

In one illustrative example, an illustrative image pixel may be configured to separate the generated image charge into an overflow portion (sometimes referred to herein as overflow charge) and a remaining portion that remains (is stored) at the photodiode (sometimes referred to herein as remaining photodiode charge). In one illustrative readout scheme, the overflow charge is readout in a low (conversion) gain readout operation in which a low gain capacitor (such as capacitor 48) is used, and the remaining photodiode charge is read out both in a high (conversion) gain readout operation (to desirably use the low noise characteristic of the high gain readout operation) and in a low gain readout operation (to desirably use the large full well capacity characteristic of the low gain readout operation). This illustrative operating scheme may help balance the different considerations associated with reading out different image signals using low and high (conversion) gain readout operations.

However, in some scenarios (e.g., when the ratio between the high conversion gain setting and the low conversion gain is too large), the above illustrative pixel and operating scheme become less attractive as the double sampling readout noise of the low gain readout operations becomes undesirably high, thereby degrading the transition SNR (signal-to-noise ratio) at the transition between low light and high light (e.g., the transition between the low gain response and the high gain response).

To mitigate or circumvent these issues while still providing high dynamic range (e.g., maintain a high ratio between low and high conversion gains), an image pixel may be configured to perform a medium conversion gain readout operation (in addition to a high conversion gain readout operation and a low conversion gain readout operation). Still referring to FIG. 3, pixel 22 may additionally include a conversion gain device such as conversion gain device 60 (sometimes referred to herein as dual or medium conversion gain device 60 or charge storage structure 60) to mitigate or circumvent these above issues. In pixel 22, both device 60 and charge storage structure 48 (e.g., capacitor 48) are configured to be selectively connected, separately or in combination, to floating diffusion region 44 to modify the storage capacity (e.g., capacitance $C_{FD}$) of floating diffusion region 44.

In the example of FIG. 3, device 60 is a two-terminal device. A first terminal of device 60 may be electrically connected to floating diffusion region 44. A second terminal of device 60 may be a gate terminal receiving control signal 'DCG'. When device 60 is activated (e.g., when control signal 'DCG' is asserted), device 60 may be configured to provide an additional capacitance to floating diffusion region 44 (e.g., extending its effective storage capacity). Device 60 may be a semiconductor device (e.g., include a MOS (metal-oxide-semiconductor) capacitor or a modified MOS transistor that provides the desired capacitance for device 60 to be connected to floating diffusion region 44) or may be any other suitable type of device that can selectively modify (e.g., increase) the capacitance at floating diffusion region 44. As an example, the capacitance of device 60 may be exhibited by a gate structure (e.g., receiving control signal 'DCG') and a semiconductor substrate (body) separated by an insulator (e.g., a gate insulator).

As illustrative examples, device 60 may exhibit a capacitance that is more than 0.25 times, more than 0.5 times, more 0.75 times, more than 1 times, less than 4 times, less than 4 times, less than 3 times, and/or less than 2 times, or in general any suitable number times the capacitance (e.g., capacitance $C_{FD}$) of floating diffusion region 44. As illustrative examples, charge storage structure 48 may exhibit a capacitance that is more than 5 times, more than 6 times, more than 10 times, more than 20 times, more than 30 times, more than 50 times, less than 150 times, less than 100 times, less than 90 times, less than 80 times, and/or less than 70 times, or in general any suitable number times the capacitance (e.g., capacitance $C_{FD}$) of floating diffusion region 44. In configurations described herein as an example, the capacitance of charge storage structure 48 may be at least ten times larger than the capacitance of floating diffusion region 44 and may be at least 2 times larger than the capacitance of device 60. In such a manner, charge storage structure 48 may be configured to support the low (conversion) gain mode of (readout) operation for pixel 22 and device 60 may be configured to support medium (conversion) gain mode of (readout) operation for pixel 22.

In general, pixel 22 in FIG. 3 may be configured to image signals using a low conversion gain readout (e.g., when at least charge storage structure 48 is connected to floating diffusion region 44), using a medium conversion gain readout operation (e.g., when the capacitance exhibited by conversion gain device 60 is connected to floating diffusion region 44), using a high conversion gain readout (e.g., when charge storage structure 48 and the capacitance exhibited by conversion gain device 60 are both disconnected from floating diffusion region 44).

FIGS. 4-8 are illustrative timing diagrams for operating one or more image pixels using a medium conversion gain device such as device 60 in FIG. 3 (e.g., to perform a low conversion gain readout, to perform a medium conversion gain readout, and/or to perform a high conversion gain readout). Configurations in which the timing diagrams are used in connection with pixel 22 in FIG. 3, image sensor 16 in FIG. 2, and/or imaging system 10 in FIG. 1 are described herein as illustrative examples. If desired, the timing diagrams of FIGS. 4-8 may be used in connection with image pixels with other configurations, image sensors with other configurations, and/or imaging systems with other configurations.

In the illustrative configurations in which pixel 22 in FIG. 3, image sensor 16 in FIG. 2 and/or imaging system 10 in FIG. 1 employ the illustrative timing diagrams of FIGS. 4-8, control signals 'select', 'transfer', 'reset', 'gain_ctrl', 'DCG', and 'SH' may be used to control the operation of pixel 22 (e.g., in FIG. 3, implemented in one or more pixels 22 in FIG. 2, implemented in one or more pixels 22 in one or more image sensors 16 in imaging system 10 in FIG. 1). In particular, control circuitry (e.g., the control circuitry for image sensor 16 such as row control circuitry 26 and/or control circuitry 24 in FIG. 2) may be configured to provide (e.g., assert and deassert) one or more (e.g., all) of these controls signal to corresponding elements in pixel 22 (and to other circuitry such as readout circuitry 28) via respective control lines 30 (FIG. 2) and other control paths.

With reference to pixel 22 in FIG. 3, the control circuitry may provide control signal 'select' to transistor 56, control signal 'transfer' to transistor 42, control signal 'reset' to transistor 50, control signal 'gain_ctrl' to transistor 46, provide control signal 'DCG' to conversion gain device 60. With reference to readout circuitry 28 in FIG. 2, the control circuitry may provide control signal SH to corresponding readout circuitry components such as sampling-and-hold circuits and sampling switches or circuits in readout circuitry 28.

Figure 4:
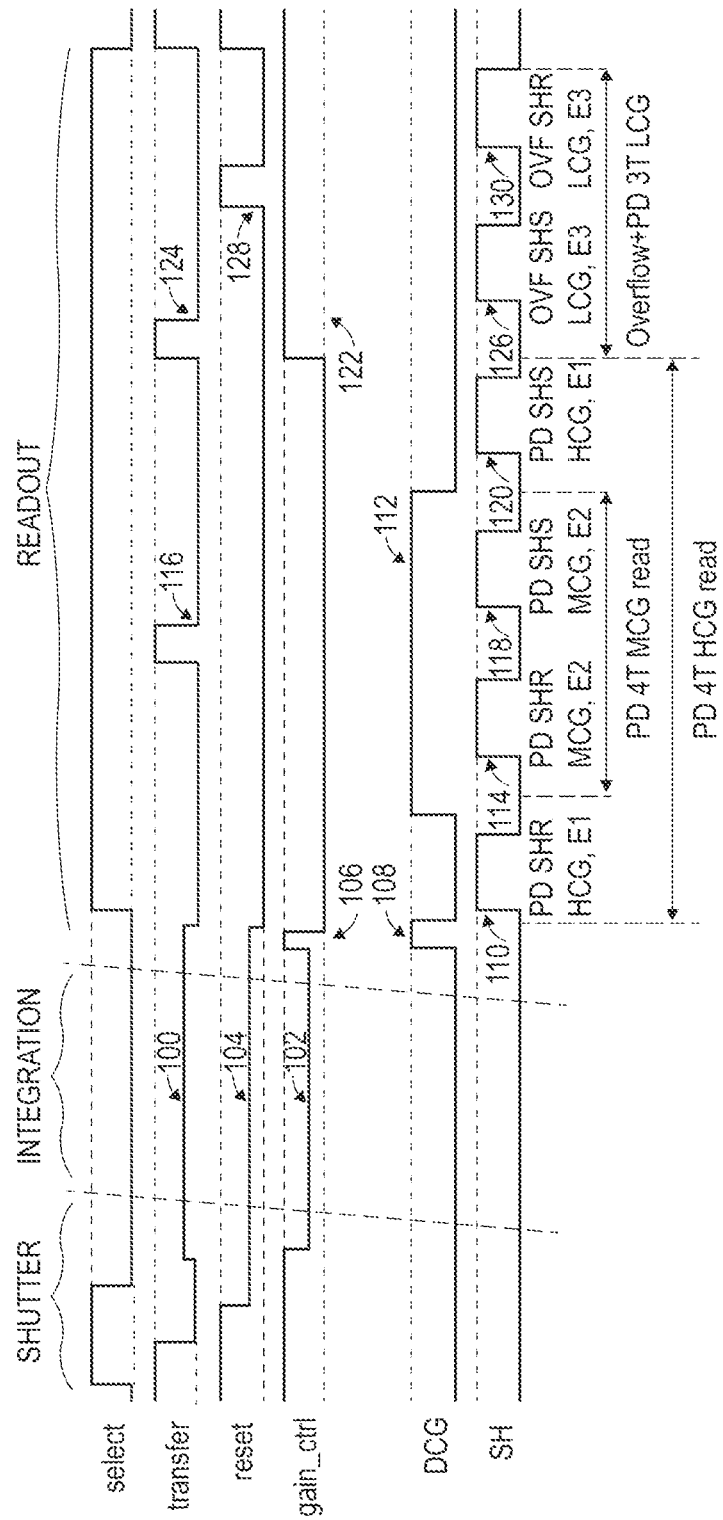
FIG. 4 is an illustrative timing diagram for operating an image pixel to perform a medium conversion gain readout nested within a high conversion gain readout in accordance with some embodiments.

First referring to FIG. 4, the control circuitry may operate pixel 22 during a shutter time period, an integration time period, and a readout time period. During the shutter time period, the control circuitry may fully assert control signals 'select', 'transfer', 'reset', and 'gain_ctrl' to reset pixel elements in pixel 22 (e.g., floating diffusion region 44, photodiode 40, and capacitor 48 in FIG. 3) to a reset voltage level (e.g., a pixel power supply voltage supplied at voltage terminal 52 in FIG. 3). After photodiode 40 has been reset to a reset voltage level (e.g., after the deassertion (falling edge) of control signal 'transfer' during the shutter time period), an integration time period for photodiode 40 may begin (e.g., photodiode 40 may begin generating/accumulating charge in response to incident light).

During the integration time period, the control circuitry may partially assert control signal 'transfer' (see, e.g., partial assertion 100 in FIG. 4) to set a (voltage) potential barrier for photodiode 40. This potential barrier may set or define the overflow portion of charge from photodiode 40 (e.g., charge above the potential barrier) and set or define the remaining portion of charge at photodiode 40 (e.g., charge below the potential barrier). During the integration time period, the control circuitry may also partially assert control signal 'gain_ctrl' (see e.g., partial assertion 102 in FIG. 4) to similarly set a potential barrier. By keeping both transistors 42 and 46 (FIG. 3) activated by the partial assertion during the integration time period, pixel 22 allows the overflow charge in excess of a desired amounted to from photodiode 40 to floating diffusion region 44 (via transistor 42) and further to capacitor 48 (via transistor 46).

If desired, the control circuitry may also partially assert control signal 'reset' during the integrating time period (see, e.g., partial assertion 104 in FIG. 4). The partially assertion of control signal 'reset' in combination control signals 'transfer' and 'gain_ctrl' helps form an anti-blooming path for photodiode 40. In particular, charge in excess of a saturation level of pixel 22 (e.g., in excess of the store capacity of floating diffusion region 44 and capacitor 48) may flow through transistors 42, 46, and 50 to voltage terminal 52.

Partial assertions of control signals 'transfer', 'gain_ctrl', and 'reset' may be to one or more suitable voltage levels, respectively, to control the corresponding transistor to form one or more potential barriers at corresponding desired levels, respectively. As an illustrative example, the control circuitry may provide a control signal at a first voltage level to fully assert the control signal, may provide the control signal at a second voltage level to deassert the control signal, and may provide a third suitable voltage level between the first and second voltage level to partially assert the control signal. The third voltage level for each control signal may vary and may be adjusted as desired depending on the type and function of the control signal (e.g., to provide a desired potential barrier level, to ensure sufficient charge transfer, etc.) and depending on the configuration of the transistor being controlled.

At the end of the integration time period (or at the beginning of the readout time period), the control circuitry may fully assert both control signals 'gain_ctrl' and 'DCG' (see, e.g., respective assertions 106 and 108 in FIG. 4) to redistribute the overflow charge between capacitor 48, floating diffusion region 44, and conversion gain device 60 (e.g., proportionally distribute charge between them based on their respective charge storage capacities). Thereafter, the readout time period may begin with the assertion of control signal 'select', which lasts throughout the readout time period. If desired, the assertion of control signal 'select' may also overlap (temporally) with assertions 106 and 108.

When the overflow charge is redistributed between capacitor 48, floating diffusion region 44, and conversion gain device 60 using assertions 106 and 108, minimal charge is left at floating diffusion region 44 because the storage capacities of capacitor 48 (mainly) and conversion gain device 60 (secondarily) are much greater than (e.g., more than 10 times greater than) the storage capacity of floating diffusion region 44. In other words, during this redistribution, almost all of the overflow charge is transferred out of floating diffusion region 44. This effectively serves as a reset operation for floating diffusion region 44 (e.g., resetting floating diffusion region to a reset level voltage). Subsequently, the control circuitry may assert control signal 'SH' (see, e.g., assertion 110 in FIG. 4), while control signals 'gain_ctrl' and 'DCG' are fully deasserted, to activate sampling circuitry in the readout circuitry such as readout circuitry 28 in FIG. 2 to sample and store a high conversion gain reset level signal (e.g., a reset level signal read out using a high conversion gain configuration) based on the reset level voltage at floating diffusion region 44.

In the illustrative timing diagram of FIG. 4, a medium conversion gain readout operation is nested within the high conversion gain readout operation. As such, following the high conversion gain readout of the reset level signal, the control circuitry may assert control signal 'DCG' and keep control signal 'DCG' asserted during the medium conversion gain readout operation (see, e.g., assertion 112 in FIG. 4). While control signal 'DCG' is asserted, charge sharing may occur between floating diffusion region 44 and conversion gain device 60 (e.g., conversion gain device 60 effectively increases the storage capacity of floating diffusion region 44 in this medium conversion gain configuration).

The medium conversion gain readout operation may begin with reading out the reset level voltage already at floating diffusion region 44 using a medium conversion gain configuration. In other words, the control circuitry may assert control signal 'SH' (see, e.g., assertion 114 in FIG. 4), while control signal 'DCG' is asserted, to activate sampling circuitry in the readout circuitry to sample and store medium conversion gain reset level signal (e.g., a reset level signal read out using a medium conversion gain configuration) based on the reset level voltage at floating diffusion region 44.

Following the medium conversion gain reset level signal readout, the control circuitry may assert control signal 'transfer' (see, e.g., assertion 116 in FIG. 4) to transfer photodiode charge to floating diffusion region 44. This charge transfer may be done while control signal 'DCG' is asserted to help avoid charge sharing with photodiode 40 during the charge transfer (e.g., while floating diffusion region storage capacity is extended by device 60 to increase floating diffusion region voltage and decrease the rate of floating diffusion region voltage decrease in response to received charge), thereby maximizing the voltage swing of the charge transfer operation before having charge-sharing with photodiode 40. Subsequently, the control circuitry may assert control signal 'SH' (see, e.g., assertion 118 in FIG. 4) to activate sampling circuitry in the readout circuitry to sample and store a medium conversion gain image signal associated with the remaining photodiode charge transferred from photodiode 40 (e.g., an image level signal read out using a medium conversion gain configuration). The medium conversion gain readout for the reset level signal and the image level signal may be a correlated double sampling readout.

Subsequent to the medium conversion gain readout for the remaining photodiode charge, the same remaining photodiode charge may be readout out in a high conversion gain configuration. In particular, the control circuitry may assert control signal 'SH' (see, e.g., assertion 120 in FIG. 4), while control signal 'DCG' is deasserted, to activate sampling circuitry in the readout circuitry to sample and store a high conversion gain image signal associated with the same remaining photodiode charge (e.g., an image level signal read out using a high conversion gain configuration). The high conversion gain readout for the reset level signal and the image signal (although separated by the medium conversion gain readout operation) may be a correlated double sampling readout.

After performing high and low conversion gain readout operations for the remaining photodiode charge, the control circuitry may control pixel to perform a low conversion gain readout for the overflow charge in combination with the remaining photodiode charge (e.g., the entire photodiode-generated charge). In particular, the control circuitry may assert control signal 'gain_ctrl' and keep control signal 'gain_ctrl' asserted during the low conversion gain readout operation (see, e.g., assertion 122 in FIG. 4). While control signal 'gain_ctrl' is asserted, charge sharing may occur between floating diffusion region 44 and capacitor 48 (e.g., capacitor 48 effectively increases the storage capacity of floating diffusion region 44 in this low conversion gain configuration).

In preparation for the image level readout operation, the control circuitry may assert control signal 'transfer' (see, e.g., assertion 124 in FIG. 4) to transfer any leftover photodiode charge (e.g., charge not transferred with previous assertion 116) to floating diffusion region 44 (and capacitor 48 connected to floating diffusion region 44). As such, following this transfer, all of the photodiode-generated charge (e.g., the overflow charge, the remaining photodiode charge, and the last leftover charge) may be shared between floating diffusion region 44 and capacitor 48.

Subsequently, the control circuitry may assert control signal 'SH' (see, e.g., assertion 126 in FIG. 4), while control signal 'gain_ctrl' is asserted, to activate sampling circuitry in the readout circuitry to sample and store a low conversion gain image signal associated with the combination of the overflow charge, the remaining photodiode charge, and the last leftover charge (e.g., an image level signal read out using a low conversion gain configuration).

A corresponding reset level signal may also be read out using the low conversion gain configuration. In preparation, the control circuitry may assert control signal 'reset' (see, e.g., assertion 128 in FIG. 4) to reset capacitor 48 and floating diffusion region 44 (because control signal 'gain_ctrl' remains asserted) to a reset level voltage. Subsequently, the control circuitry may assert control signal 'SH' (see, e.g., assertion 130 in FIG. 4), while control signal 'gain_ctrl' is asserted, to activate sampling circuitry in the readout circuitry to sample and store a low conversion gain reset level signal (e.g., a reset level signal read out using a low conversion gain configuration) based on the reset level voltage at floating diffusion region 44. While the low conversion gain image signal readout may be associated with the low conversion gain reset level signal readout as a double sampling readout, they have uncorrelated noise with respect to each other.

As described above, the illustrative timing diagram of FIG. 4 enables the control circuitry to operate pixel 22 (and accordingly, an array of pixels 22 in image sensor 16 in FIG. 2 in imaging system 10 in FIG. 1) to perform a correlated double sampling readout for reset and image level signals (e.g., associated with the remaining photodiode charge) in a high conversion gain configuration, a correlated double sampling readout for reset and image level signals (e.g., associated with the remaining photodiode charge) in a medium conversion gain configuration, and readouts for reset and image level signals (e.g., associated with the combination of the overflow charge, the remaining photodiode charge, and the last leftover charge) in a low conversion gain configuration.

The timing diagram of FIG. 4 is merely illustrative. If desired, any suitable modification may be made to the timing diagram of FIG. 4. As an illustrative example, while the timing diagram of FIG. 4 nests the medium conversion gain readout operation within the high conversion gain readout operation, this may be undesirable as the readout operation in high conversion gain is most sensitive to noise effects but also spans a relatively longer period of time (e.g., longer than the medium conversion gain readout operation, from the high conversion gain reset level signal readout to the high conversion gain image level signal readout), which can introduce significant noise.

Figure 5:
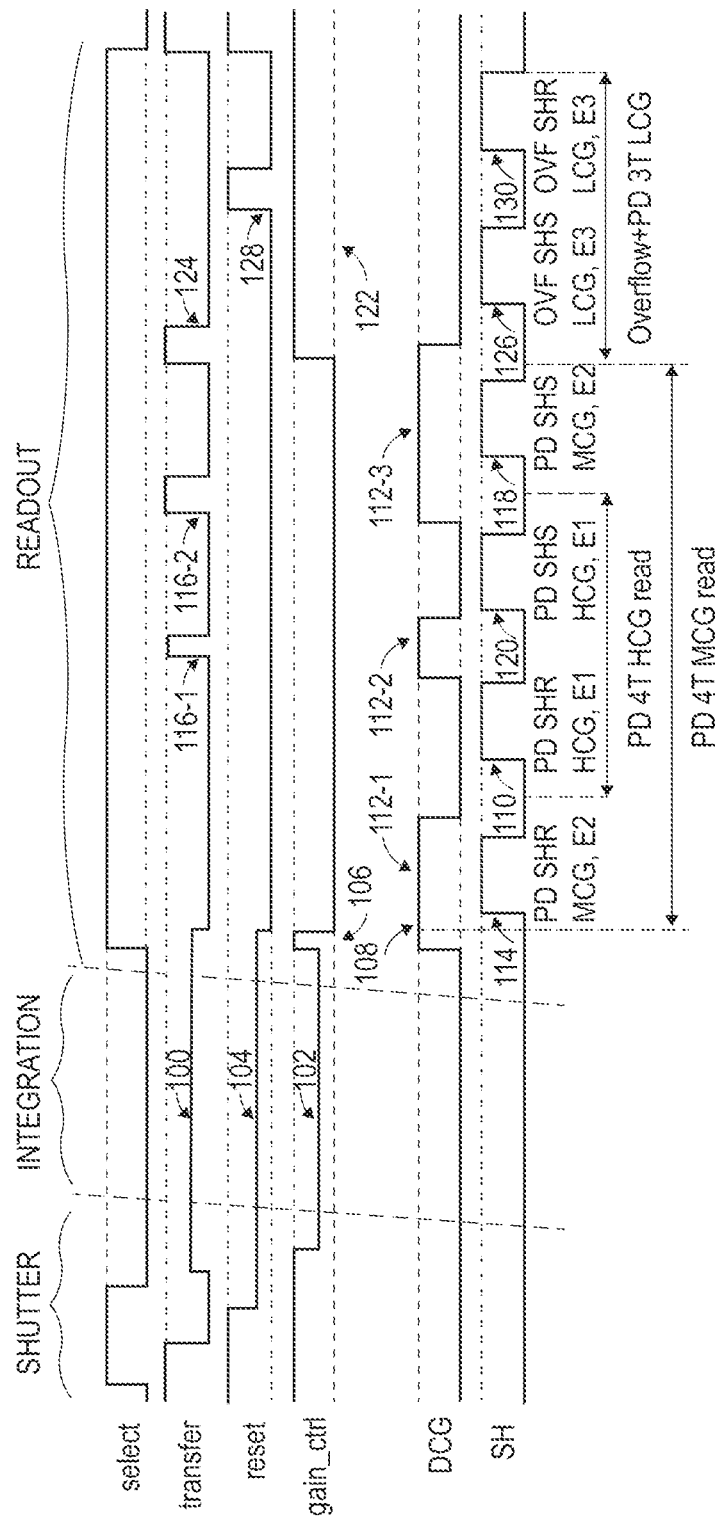
FIG. 5 is an illustrative timing diagram for operating an image pixel to perform a high conversion gain readout nested within a medium conversion gain readout in accordance with some embodiments.

To mitigate these issues, an image pixel may be operated to nest the high conversion gain readout operation within the medium conversion gain readout operation. FIG. 5 is an illustrative timing diagram based on which the control circuitry can control pixel 22 to perform the high conversion gain readout operation nested within the medium conversion gain readout operation.

The timing diagram in FIG. 5 includes some of the same or similar features as the timing diagram in FIG. 4. Description of these same or similar features are omitted for the sake of clarity (e.g., in order to not unnecessarily obscure the embodiments of FIG. 5). Unless otherwise specified, the corresponding features in the timing diagram of FIG. 5 may serve the same or similar functions, have the same or similar characteristics, and be used by control circuitry to operate and control pixels (e.g., a pixel row, a pixel array) in the same or similar manners as features described in connection with the timing diagram of FIG. 4. In particular, the timings with respect to the medium and high conversion gain readout operations in FIG. 5 are different than those in FIG. 4 and are further detailed below.

As shown in FIG. 5, following assertions 106 and 108, the control circuitry may keep control signal 'DCG' asserted (see, e.g., assertion 112-1 continuous with assertion 108 in FIG. 5) to first perform the medium conversion gain readout for the reset level signal (e.g., using assertion 114 in FIG. 5). Subsequently, the control circuitry may deassert control signal 'DCG' and perform the high conversion gain readout for the reset level signal (e.g., using assertion 110 in FIG. 5).

To prepare for the image level signal readout operation in the high conversion gain configuration, the control circuitry may assert control signals 'transfer' and 'DCG' (see, e.g., assertions 116-1 and 112-2 in FIG. 5, respectively) to efficiently transfer the remaining photodiode charge to floating diffusion region 44 (e.g., perform the photodiode charge transfer while helping to avoid charge sharing with photodiode 40 by asserting control signal 'DCG'). Subsequently, the control circuitry may deassert control signal 'DCG' and perform the high conversion gain readout for the image level signal associated with the remaining photodiode charge (e.g., using assertion 120 in FIG. 5).

To prepare for the image level signal readout operation in the medium conversion gain configuration, the control circuitry may assert control signals 'transfer' and 'DCG' again (see, e.g., assertions 116-2 and 112-3 in FIG. 5, respectively) to ensure that any other remaining photodiode charge is all transferred to floating diffusion region 44. Subsequently, the control circuitry may keep control signal 'DCG' asserted (e.g., assertion 112-3) and perform the medium conversion gain readout for the image signal associated with the remaining photodiode charge based on assertions 116-1 and 116-2 (e.g., using assertion 118 in FIG. 5).

The timing diagram of FIG. 5 is merely illustrative. If desired, any suitable modification may be made to the timing diagram of FIG. 5. As an illustrative example, while the timing diagrams of FIGS. 4 and 5 both nest the medium conversion gain readout operation and the high conversion gain readout operation relative to each other, it may be more desirable (in view of readout circuitry processing and storage) to perform the medium conversion gain readout operation separately from the high conversion gain readout operation (e.g., in respective sequential signal and reset level pairs).

Figure 6:
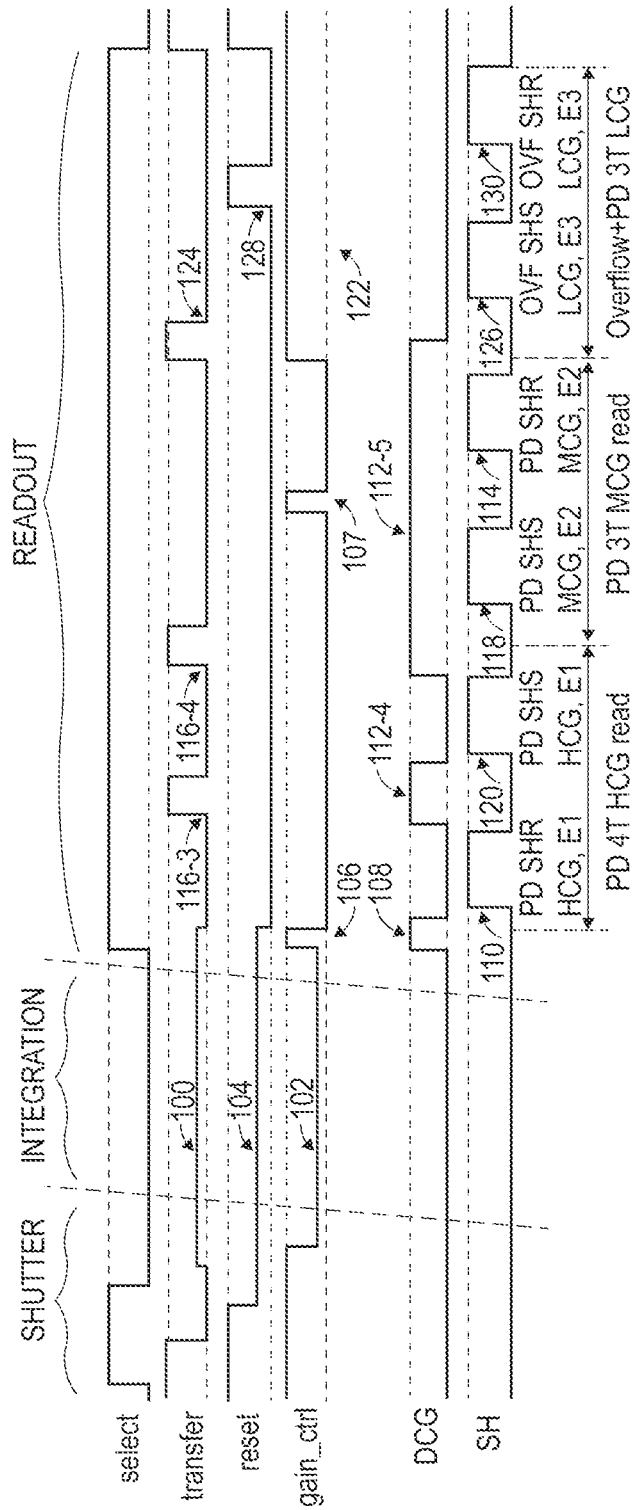
FIG. 6 is an illustrative timing diagram for operating an image pixel to perform a medium conversion gain readout separate from a high conversion gain readout in accordance with some embodiments.

As such, an image pixel may be operated to, for example, perform and finish the high conversion gain readout operation before beginning the medium conversion gain readout operation. FIG. 6 is an illustrative timing diagram based on which the control circuitry can control pixel 22 to perform the high conversion gain readout operation separately from (e.g., complete the high conversion gain readout operation before) the medium conversion gain readout operation.

The timing diagram in FIG. 6 includes some of the same or similar features as the timing diagrams in FIGS. 4 and 5. Description of these same or similar features are omitted for the sake of clarity (e.g., in order to not unnecessarily obscure the embodiments of FIG. 6). Unless otherwise specified, the corresponding features in the timing diagram of FIG. 6 may serve the same or similar functions, have the same or similar characteristics, and be used by control circuitry to operate and control pixels (e.g., a pixel row, a pixel array) in the same or similar manners as features described in connection with the timing diagrams of FIGS. 4 and 5. In particular, the timings with respect to the medium and high conversion gain readout operations in FIG. 6 are different than those in FIGS. 4 and 5 and are further detailed below.

As shown in FIG. 6, following assertions 106 and 108, the control circuitry may assert control signal 'SH' (see, e.g., assertion 110 in FIG. 6) to perform a high conversion gain readout for the reset level signal (e.g., similar to the timing of assertion 110 in FIG. 4). In contrast, with the timing diagrams of FIGS. 4 and 5, the control circuitry may follow the high conversion gain reset level readout with the high conversion gain image level signal readout.

In preparation for the high conversion gain image level signal readout, the control circuitry may assert control signals 'transfer' and 'DCG' (see, e.g., assertions 116-3 and 112-4 in FIG. 6, respectively) to efficiently perform charge transfer operations (e.g., while mitigating charge sharing with photodiode 40) and transfer the remaining photodiode charge to floating diffusion region 44. Subsequently, the control circuitry may deassert control signal 'DCG' and perform the high conversion gain readout for the image level signal associated with the remaining photodiode charge (e.g., using assertion 120 in FIG. 6). This high conversion gain readout of the reset and image level signals may be a correlated double sampling readout.

After completion of the high conversion gain readout operation, the medium conversion gain readout operation may begin. Throughout the medium conversion gain readout operation, the control circuitry may keep control signal 'DCG' asserted (see, e.g., assertion 112-5. To prepare for the image level signal readout operation in the medium conversion gain configuration, the control circuitry may assert control signals 'transfer' and 'DCG' again (see, e.g., assertions 116-4 and 112-5 in FIG. 6, respectively) to ensure that any other remaining photodiode charge is all transferred to floating diffusion region 44. Subsequently, the control circuitry may keep control signal 'DCG' asserted and perform the medium conversion gain readout for the image signal associated with the remaining photodiode charge based on assertions 116-3 and 116-4 (e.g., using assertion 118 in FIG. 6).

Thereafter, the control circuitry may assert control signal 'gain_ctrl' (see, e.g., assertion 107 in FIG. 6) to effectively reset floating diffusion region 44 to a reset level voltage (e.g., a voltage imparted by being connected to capacitor 48). While this reset operation cannot provide floating diffusion region with a "true" reset level (e.g., a supply voltage level supplied by voltage terminal 52) since capacitor 48 is storing the overflow charge, this approach provide satisfactory performance as the reset level voltage in this reset operation is a small fraction of the image level signal and has a small impact on the gain of the medium conversion gain image signal.

Subsequent to this reset operation, the control circuitry may assert control signal 'SH' (see, e.g., assertion 114 in FIG. 6), while control signal 'DCG' remains asserted, to perform a medium conversion gain readout for the reset level signal based on the reset level voltage from the reset portion. While the medium conversion gain image signal readout may be associated with the medium conversion gain reset level signal readout as a double sampling readout, they have uncorrelated noise with respect to each other.

Figure 7:
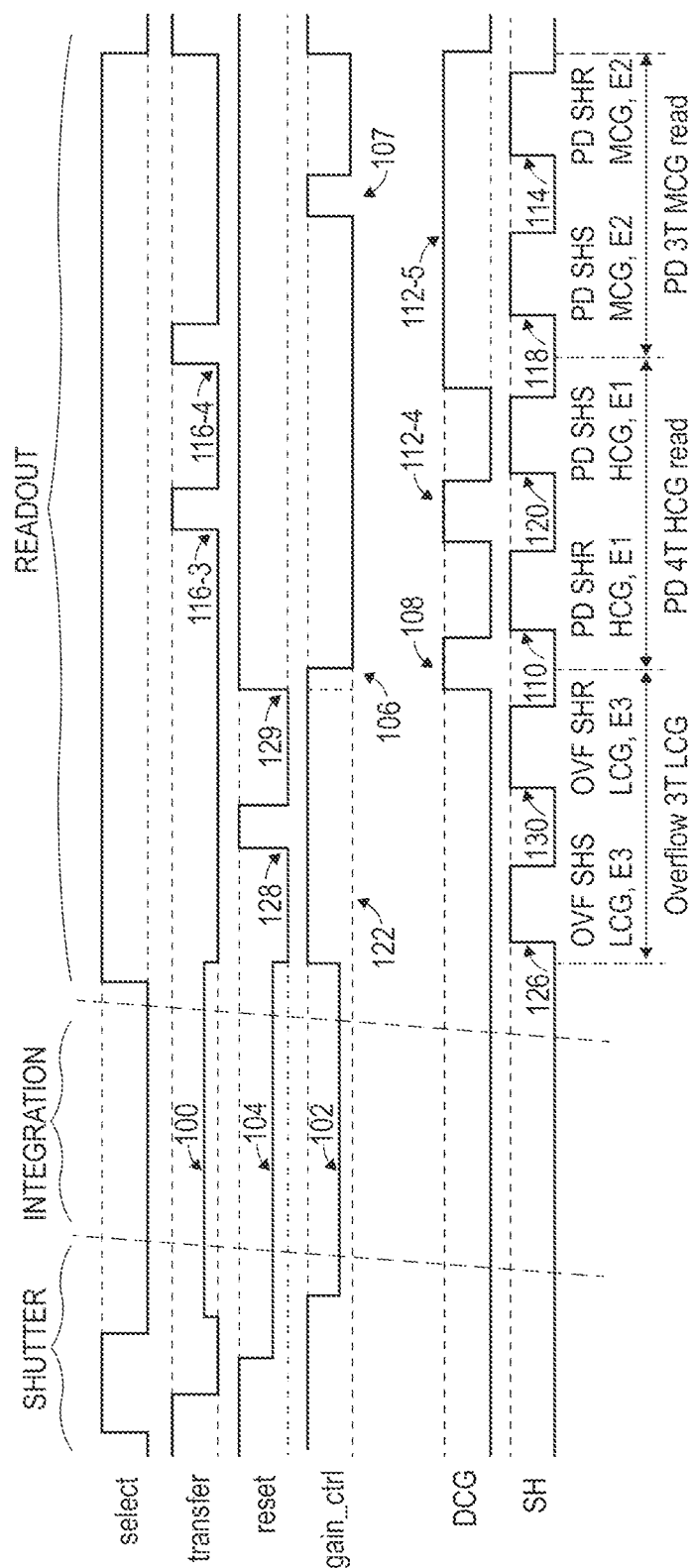
FIG. 7 is an illustrative timing diagram for operating an image pixel to perform a low conversion gain readout prior to high and medium conversion gain readouts in accordance with some embodiments.

The timing diagram of FIG. 6 is merely illustrative. If desired, any suitable modification may be made to the timing diagram of FIG. 6. If desired, the timing diagram of FIG. 6 may be modified such that the low conversion gain readout operation may occur for the overflow charge (excluding the remaining photodiode charge) before the high and medium conversion gain operations for the remaining photodiode charge. FIG. 7 is an illustrative timing diagram based on which the control circuitry can control pixel 22 to perform the overflow charge readout in a low conversion gain configuration prior to performing the remaining photodiode charge readouts in the high and medium conversion gain configurations.

The timing diagram in FIG. 7 includes some of the same or similar features as the timing diagrams in FIGS. 4-6. Description of these same or similar features are omitted for the sake of clarity (e.g., in order to not unnecessarily obscure the embodiments of FIG. 7). Unless otherwise specified, the corresponding features in the timing diagram of FIG. 7 may serve the same or similar functions, have the same or similar characteristics, and be used by control circuitry to operate and control pixels (e.g., a pixel row, a pixel array) in the same or similar manners as features described in connection with the timing diagrams of FIGS. 4-6. In particular, the timings with respect to the low, medium, and high conversion gain readout operations in FIG. 7 are different than those in FIGS. 4-6 and are further detailed below.

In the illustrative timing diagram of FIG. 7, the low conversion gain readout operation occurs first after the integration time period. During the low conversion gain readout operation, the same assertions with the same relative timings as described in connection with FIGS. 4, 5, and 6 with respect to the low conversion gain readout operation (see, e.g., assertions 122, 126, 128, and 130 in FIG. 4 and in FIG. 7) may occur, with the exception of assertion 124 (FIG. 4). Assertion 124 is omitted from FIG. 7 since the low conversion gain readout operation in FIG. 7 is for the overflow charge and not the combination of the overflow charge and the remaining photodiode charge.

In particular, during the low conversion gain readout, the control circuitry may keep control signal 'gain_ctrl' asserted while reading out the low conversion gain image level signal associated with the overflow charge (e.g., using assertion 126 in FIG. 7). The control circuitry may then assert control signal 'reset' (see, e.g., assertion 128) to reset floating diffusion region 44 and capacitor 48 to a reset voltage level (e.g., a pixel supply voltage). Subsequently, the control circuitry may assert control signal 'SH', while control signal 'gain_ctrl' remains asserted to read out the low conversion gain reset level signal (e.g., using assertion 130 in FIG. 7).

After the low conversion gain readout operation, the high conversion gain readout operation and subsequently the medium conversion gain readout operation may occur. During the low conversion gain readout operation, the same assertions with the same relative timings as described in connection with FIG. 6 with respect to the high and medium conversion gain readout operation (see, e.g., assertions 106, 107, 108, 110, 112-4, 112-5, 114, 116-3, 116-4, 118, 120, in FIG. 6 and in FIG. 7) may occur. Further description of these assertions and their relative timings is omitted for the sake of clarity.

Additionally, and in contrast with FIG. 6, given that capacitor 48 no longer stores the overflow charge (e.g., the overflow charge has already been read out in the low conversion gain readout operation and removed from the pixel), the control circuitry may continually assert control signal 'reset' (see, e.g., assertion 129) to hold capacitor 48 at the reset voltage and provide a "true" reset level voltage to floating diffusion region 44 when control signal 'gain_ctrl' is asserted (e.g., at assertions 106 and 107).

Figure 8:
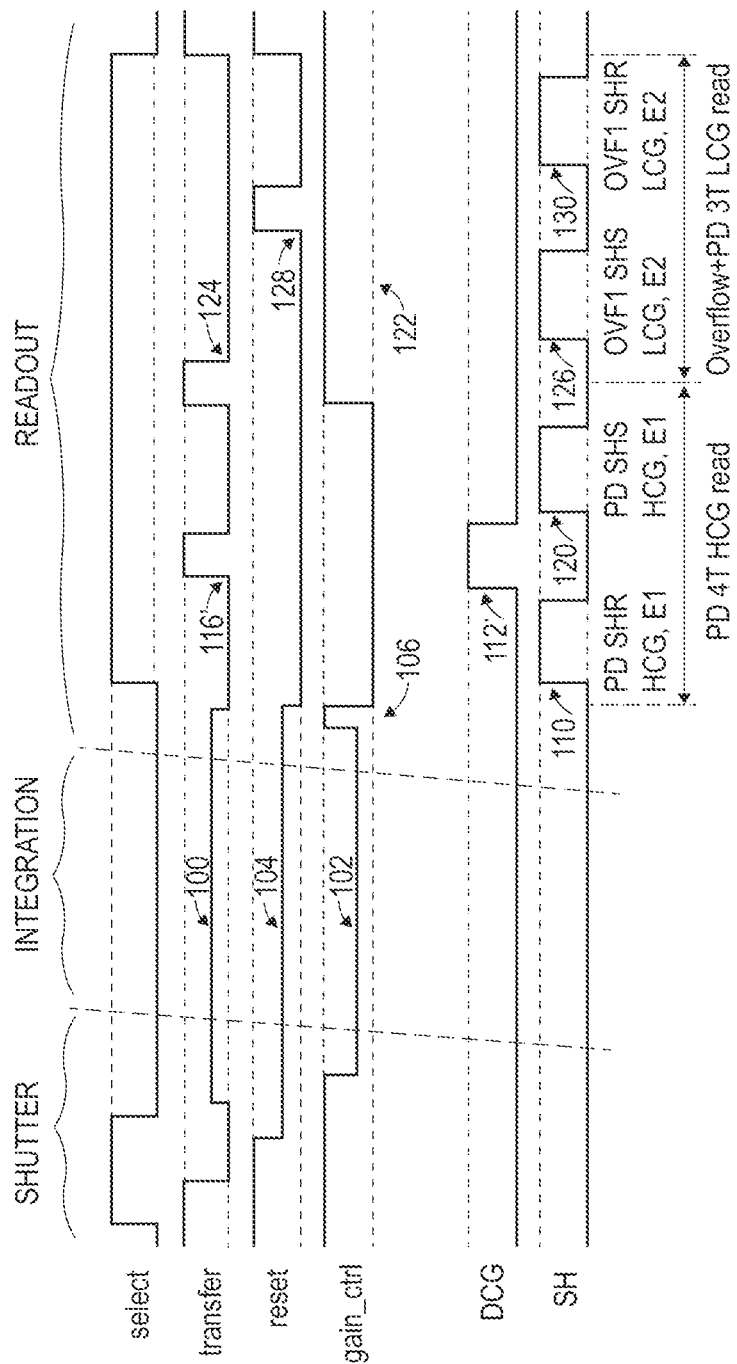
FIG. 8 is an illustrative timing diagram for operating an image pixel to perform readout operations without a medium conversion gain readout in accordance with some embodiments.

Referring back to FIG. 4, while FIG. 4 (and similarly FIGS. 5-7) show readout operations with three different conversion gain configurations (e.g., high, medium, and low conversion gain readouts), this is merely illustrative. If desired, the medium conversion gain readout operation may be omitted. FIG. 8 is an illustrative timing diagram based on which the control circuitry can control pixel 22 to perform a high conversion gain readout operation separately and a low conversion gain readout operation.

The timing diagram in FIG. 8 includes some of the same or similar features as the timing diagram in FIG. 4. Description of these same or similar features are omitted for the sake of clarity (e.g., in order to not unnecessarily obscure the embodiments of FIG. 8). Unless otherwise specified, the corresponding features in the timing diagram of FIG. 8 may serve the same or similar functions, have the same or similar characteristics, and be used by control circuitry to operate and control pixels (e.g., a pixel row, a pixel array) in the same or similar manners as features described in connection with the timing diagram of FIG. 4. In particular, the timings with respect to the medium and high conversion gain readout operations in FIG. 8 are different than those in FIG. 4 and are further detailed below.

As shown in FIG. 8 (in comparison with FIG. 4), assertions 114 and 118 associated with a medium conversion gain readout operation (present in FIG. 4) are omitted from FIG. 8. Accordingly, assertion 108 (present in FIG. 4) is also omitted from FIG. 8. By asserting control signal 'gain_ctrl' (see, e.g., assertion 106) without asserting control signal 'DCG' (e.g., without assertion 108), the reset operation in FIG. 8 can bring the floating diffusion voltage close to the reset level voltage (e.g., the supply voltage), which is satisfactory for the subsequent high conversion gain reset level readout operation.

For the high conversion gain readout operation (similar to the high conversion gain readout operation in FIG. 5 or FIG. 6), the control circuitry may use assertion 110 to perform the reset level high conversion gain readout, may use assertions 116' and 112' to efficiently perform the remaining photodiode charge transfer to floating diffusion region 44, and may use assertion 120 to perform the image level high conversion gain readout. Because the charge transfer operation is done using a medium conversion gain configuration (e.g., when control signal 'DCG' is asserted), the voltage swing for the (high conversion gain) image charge may be increased before charge sharing with photodiode 40 occurs.

Various embodiments have been described illustrating image sensors having image pixels with multiple conversion gain structures or devices coupled to the floating diffusion region.

As an example, an image sensor may include an image sensor pixel array and control circuitry coupled to the image sensor pixel array. One or more image sensor pixels may each include a photodiode (or generally, a photosensitive element), a floating diffusion region coupled to the photodiode, a charge storage structure (e.g., a capacitor) for a first (low) conversion gain configuration coupled to the floating diffusion region, a (medium) conversion gain device for a second (medium) conversion gain configuration coupled to the floating diffusion region, and a transistor coupled between the photodiode and the floating diffusion region and configured to set a potential barrier to separate photodiode-generated charge into a first portion (e.g., a charge portion less than the potential barrier that remains at the photodiode) and a second portion (e.g., a charge portion greater than the potential barrier that overflows to the floating diffusion region and the charge storage structure). The charge storage structure may be configured to extend a charge storage capacity of the floating diffusion region by a first amount and the conversion gain device is configured to extend the charge storage capacity of the floating diffusion region by a second amount less than the first amount. The control circuitry may be configured to control the image sensor pixel to transfer the overflow charge from the photodiode to the floating diffusion region for a third (high) conversion gain configuration at least in part by connecting the floating diffusion region to the conversion gain device.

If desired, control circuitry may be configured to control the image sensor pixel to perform a correlated double sampling readout operation based on the remaining photodiode charge using the third conversion gain configuration. The control circuitry may be configured to control the image sensor pixel to perform a double sampling readout operation based on the remaining photodiode charge using the second conversion gain configuration. The control circuitry may be configured to control the image sensor pixel to perform a double sampling readout operation based on the overflow charge using the first conversion gain configuration. If desired, the control circuitry may be configured to control the image sensor pixel to perform the double sampling readout operation based on the overflow charge and the remaining photodiode charge using the first conversion gain configuration. If desired, the control circuitry may be configured to control the image sensor pixel to store the overflow charge at the charge storage structure while the image sensor pixel performs the correlated double sampling readout operation based on the remaining photodiode charge using the third conversion gain configuration.

As another example, a method of operating an image sensor pixel may include separating photodiode-generated charge into a first (remaining photodiode) portion and a second (overflow) portion, performing a high conversion gain readout operation based on the first portion, performing a medium conversion gain readout operation based on the first portion by using a first conversion gain device, and performing a low conversion gain readout operation based on the second portion by using a second conversion gain device.

If desired, the high conversion gain readout operation may be performed before the medium conversion gain readout operation. If desired, the low conversion gain readout operation may be performed after the medium conversion gain readout operation. If desired, the low conversion gain readout operation may be performed before the high conversion gain readout operation. If desired, the high and medium conversion gain readout operations are nested within each other (e.g., the high conversion gain readout operation may be nested within the medium conversion gain readout operation or vice versa).

As yet another example, an image sensor may include an image pixel and control circuitry coupled to the image pixel. The image pixel may include a photosensitive element, a floating diffusion region, a charge transfer transistor coupling the photosensitive element to the floating diffusion region, a low conversion gain capacitor coupled to the floating diffusion region via a gain control transistor, and a medium conversion gain device coupled to the floating diffusion region. The medium conversion gain device may have a control terminal configured to receive a control signal, which, when asserted, causes the medium conversion gain device to extend a charge storage capacity of the floating diffusion region.

If desired, the floating diffusion region may have a first charge storage capacity, the medium conversion gain device may have a second charge storage capacity that is less than three times the first charge storage capacity, and the low conversion gain capacitor may have a third charge storage capacity that is greater than ten times the first charge storage capacity. If desired, the control circuitry may be configured to control the image pixel to perform a high conversion gain readout operation, a medium conversion gain readout operation, and a low conversion gain readout operation based on charge generated by the photosensitive element from one integration time period.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
    an array of image sensor pixels having an image sensor pixel, the image sensor pixel including:
        a photodiode;
        a floating diffusion region coupled to the photodiode;
        a first capacitor for a first conversion gain configuration coupled to the floating diffusion region; and
        a second capacitor for a second conversion gain configuration coupled to the floating diffusion region; and
    control circuitry coupled to the image sensor pixel and configured to control the image sensor pixel to transfer charge from the photodiode to the floating diffusion region for a third conversion gain configuration at least in part by connecting the floating diffusion region to the second capacitor.

2. The image sensor defined in claim 1, wherein the first conversion gain configuration is a low conversion gain configuration, the second conversion gain configuration is a medium conversion gain configuration, and the third conversion gain configuration is a high conversion gain configuration.

3. The image sensor defined in claim 1, wherein the control circuitry is configured to control the image sensor pixel to transfer overflow charge to the first capacitor.

4. The image sensor defined in claim 3, wherein the charge transferred from the photodiode to the floating diffusion region comprises remaining photodiode charge remaining at the photodiode after the overflow charge is transferred.

5. The image sensor defined in claim 4, wherein the control circuitry is configured to control the image sensor pixel to perform a correlated double sampling readout operation based on the remaining photodiode charge using the third conversion gain configuration.

6. The image sensor defined in claim 5, wherein the control circuitry is configured to control the image sensor pixel to perform a double sampling readout operation based on the remaining photodiode charge using the second conversion gain configuration.

7. The image sensor defined in claim 6, wherein the control circuitry is configured to control the image sensor pixel to perform a double sampling readout operation based on the overflow charge using the first conversion gain configuration.

8. The image sensor defined in claim 6, wherein the control circuitry is configured to control the image sensor pixel to perform a double sampling readout operation based on the overflow charge and the remaining photodiode charge using the first conversion gain configuration.

9. The image sensor defined in claim 5, wherein the control circuitry is configured to control the image sensor pixel to store the overflow charge at the first capacitor while the image sensor pixel performs the correlated double sampling readout operation based on the remaining photodiode charge using the third conversion gain configuration.

10. The image sensor defined in claim 1 wherein the first capacitor is configured to extend a charge storage capacity of the floating diffusion region by a first amount and the second capacitor is configured to extend the charge storage capacity of the floating diffusion region by a second amount less than the first amount.

11. The image sensor defined in claim 1, wherein the second capacitor comprises a gate, a substrate, and an insulator between the gate and the substrate and wherein the control circuitry is configured to provide a control signal to the gate of the second capacitor.

12. A method of operating an image sensor pixel, the method comprising:
    separating photodiode-generated charge into a first portion and a second portion;
    performing a high conversion gain readout operation based on the first portion;
    performing a medium conversion gain readout operation based on the first portion by using a first conversion gain device; and
    performing a low conversion gain readout operation on a combination of the first and second portions by using a second conversion gain device.

13. The method defined in claim 11, wherein the second portion comprises an overflow portion above a potential barrier and the first portion comprises a remaining portion below the potential barrier.

14. The method defined in claim 12, wherein performing the high conversion gain readout operation comprises performing a charge transfer operation in a medium conversion gain configuration with the first conversion gain device activated.

15. The method defined in claim 12, wherein the high conversion gain readout operation is performed before the medium conversion gain readout operation, and the low conversion gain readout operation is performed after the medium conversion gain readout operation.

16. The method defined in claim 12, wherein the high and medium conversion gain readout operations are nested within each other.

17. An image sensor comprising:
    an image pixel including:
        a photosensitive element;
        a floating diffusion region;
        a charge transfer transistor coupling the photosensitive element to the floating diffusion region;
        a reset transistor coupling a voltage terminal to the floating diffusion region via a first path;
        a low conversion gain capacitor coupled to the floating diffusion region via a gain control transistor, wherein the first path includes the gain control transistor and wherein the low conversion gain capacitor is coupled along the first path; and
        a medium conversion gain device coupled to the floating diffusion region via a second path separate from the first path.

18. The image sensor defined in claim 17, wherein the medium conversion gain device has a control terminal configured to receive a control signal, and when the control signal is asserted, the medium conversion gain device is configured to extend a charge storage capacity of the floating diffusion region.

19. The image sensor defined in claim 17, wherein the floating diffusion region has a first charge storage capacity, the medium conversion gain device has a second charge storage capacity that is less than three times the first charge storage capacity, and the low conversion gain capacitor has a third charge storage capacity that is greater than ten times the first charge storage capacity.

20. The image sensor defined in claim 17, further comprising:
control circuitry coupled to the image pixel and configured to control the image pixel to perform a charge transfer operation for a high conversion gain readout operation, wherein the control circuitry is configured to control the image pixel to activate the medium conversion gain device to perform the charge transfer operation for the high conversion gain readout operation.

* * * * *